Aug. 5, 1969

O'DELL F. KEIL 3,459,141

APPARATUS AND METHOD FOR THE CONTINUOUS
PRODUCTION OF SHAPED-DOUGH PIECES

Filed Jan. 25, 1967

INVENTOR:
ODELL F. KEIL
BY Dawson, Tilton, Fallon,
Lungmus & Alexander,
ATT'YS

INVENTOR:
O'DELL F. KEIL

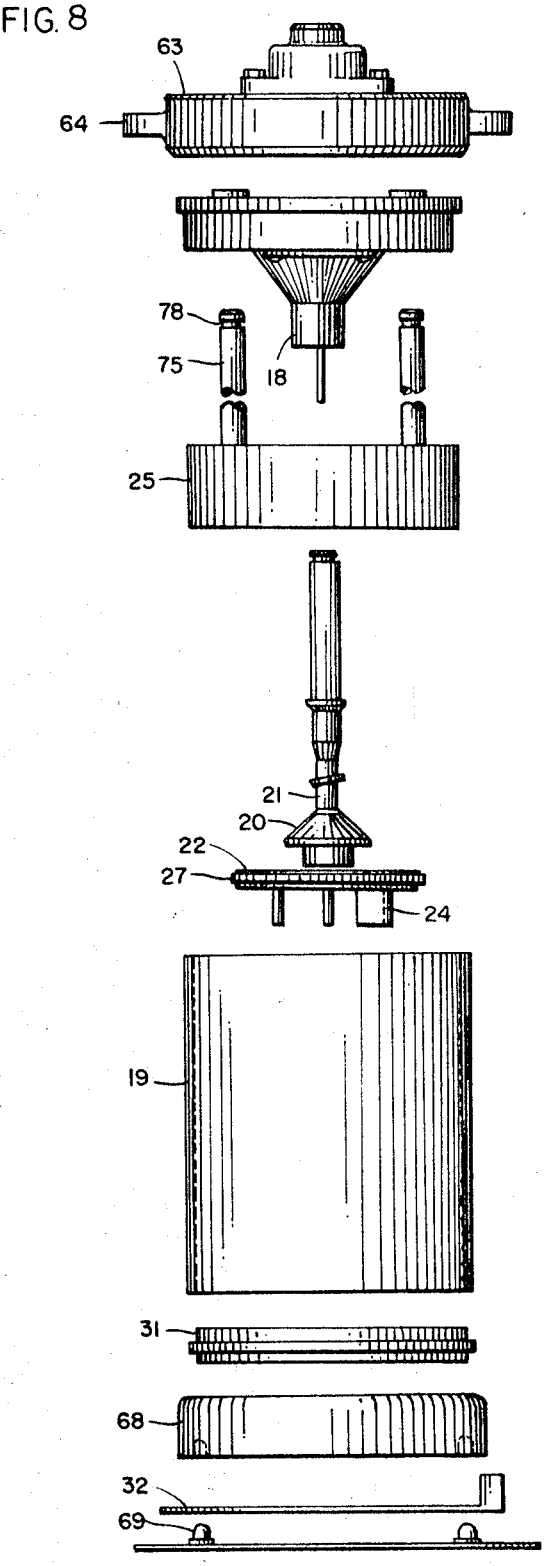

United States Patent Office 3,459,141
Patented Aug. 5, 1969

3,459,141
**APPARATUS AND METHOD FOR THE CONTINU-
OUS PRODUCTION OF SHAPED-DOUGH PIECES**
O'Dell F. Keil, Phoenix, Ariz., assignor, by mesne assignments, to American Potato Company, a corporation
Filed Jan. 25, 1967, Ser. No. 611,658
Int. Cl. A21c *11/18*
U.S. Cl. 107—14                                18 Claims

ABSTRACT OF THE DISCLOSURE

An apparatus and method for producing shaped-dough pieces such as are used for making French fry type potatoes by mixing water with a dry mix. A measured amount of the dry mix is introduced through a funnel into an extrusion chamber and deflected by a cone-shaped deflector onto a rotating distributing disc which is being flooded with cold water. The water wets the particles, which are discharged by centrifugal force from the distributing disc and then mixed by rotating blades to provide a homogeneous fluid suspension. A reciprocating piston compresses the mix and then retracts to allow another charge to be introduced and mixed. The length of the extrusion chamber is such that by the time a particular charge reaches the end thereof the mixture has thickened to develop a dough suitable for extruding. With each downward stroke of the piston the lowermost charge in the extrusion chamber is extruded through dies to provide shaped-dough pieces suitable for cooking.

BACKGROUND OF THE INVENTION

The invention finds particular utility in connection with forming French fry type potatoes. In the past these have been provided in fresh frozen form for use in restaurants, homes, etc.—with no suitable substitute for continuously producing similar strips from dough at site of use.

SUMMARY OF INVENTION

According to this invention, it is possible to take a dry mix (e.g., potato particles and binder) and combine it with a proper amount of water to provide a homogeneous dough-like substance, and extrude the same, all automatically. Inasmuch as French frying tends to subject the dough strips to mechanical stresses, the provision of a relatively firm strip, particularly when made from a particle mix, is necessary. This I am able to achieve in the practice of the invention while also attaining a relatively speedy operation—so as to make the invention particularly attractive to restaurants.

DESCRIPTION OF DRAWINGS

FIG. 8 is an exploded view of the apparatus of FIG. 5.

DESCRIPTION OF PREFERRED EMBODIMENT

Figure 1:
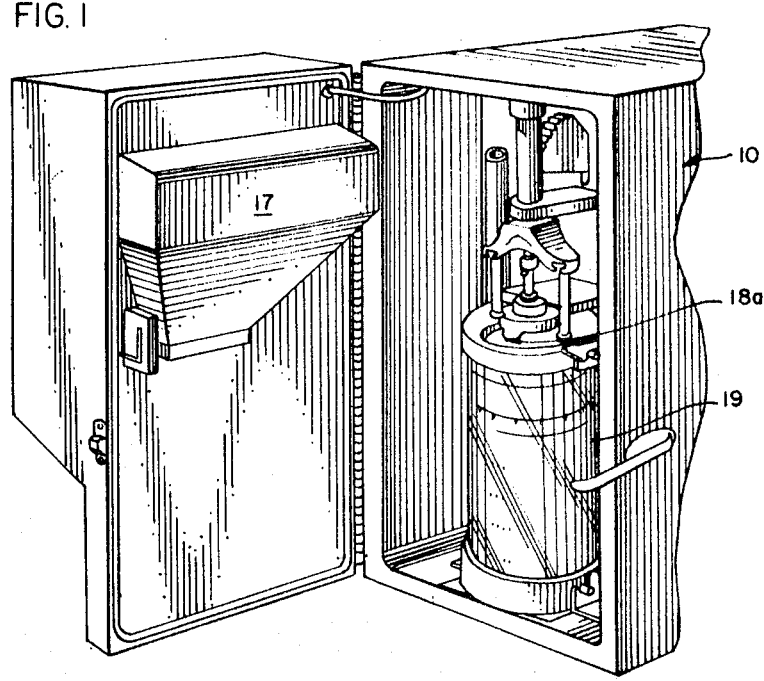
FIG. 1 is a fragmentary perspective view of the apparatus embodying the teachings of the invention.
Figure 2:
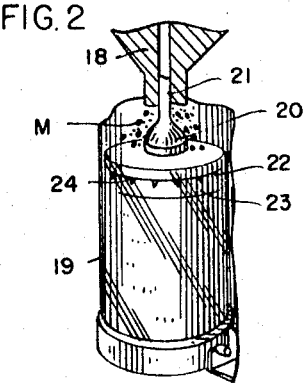
FIGS. 2, 3, and 4 are fragmentary perspective views, partially broken away to show the extruder portion of FIG. 1 in different stages of operation.

In the illustration given and with reference to FIGS. 1 and 2, the numeral 10 designates generally an insulated enclosure which is adapted to be suitably supported in a restaurant, lunchroom, etc. for the purpose of converting the dry potato-binder mix available from American Potato Company, Blackfoot, Idaho, into dough shapes suitable for French frying. I desire to keep the raw material at a temperature of the order of 40° F. to retard bacterial deterioration, and to slow the water absorption rate of the dry potato-binder mix. For this purpose I include just rearward of the enclosure 10 and on the same platform 11 (see FIG. 6) a motor-compressor unit 12 for the evaporator 13. The evaporator 13 is seen only in fragmentary form, and then only in FIGS. 1 and 5, but it will be appreciated that the evaporator surface is quite extensive, and is used in combination with the cold water supply hose 14 (see the central portion of FIG. 5). Additionally, I provide the usual condenser 15 (see the extreme right-hand portion of FIG. 6), along with a fan motor unit 16, also provided on the platform 11. The elements 12, 15, and 16 are represented schematically in the extreme lower left-hand portion of FIG. 7. Water for the mixing can be obtained from the metropolitan mains, wells, etc., and the mix is discharged from a substantially sized hopper 17 (designated in FIGS. 1, 5 and 6 in the upper portions thereof).

OPERATION IN GENERAL

Figure 5:
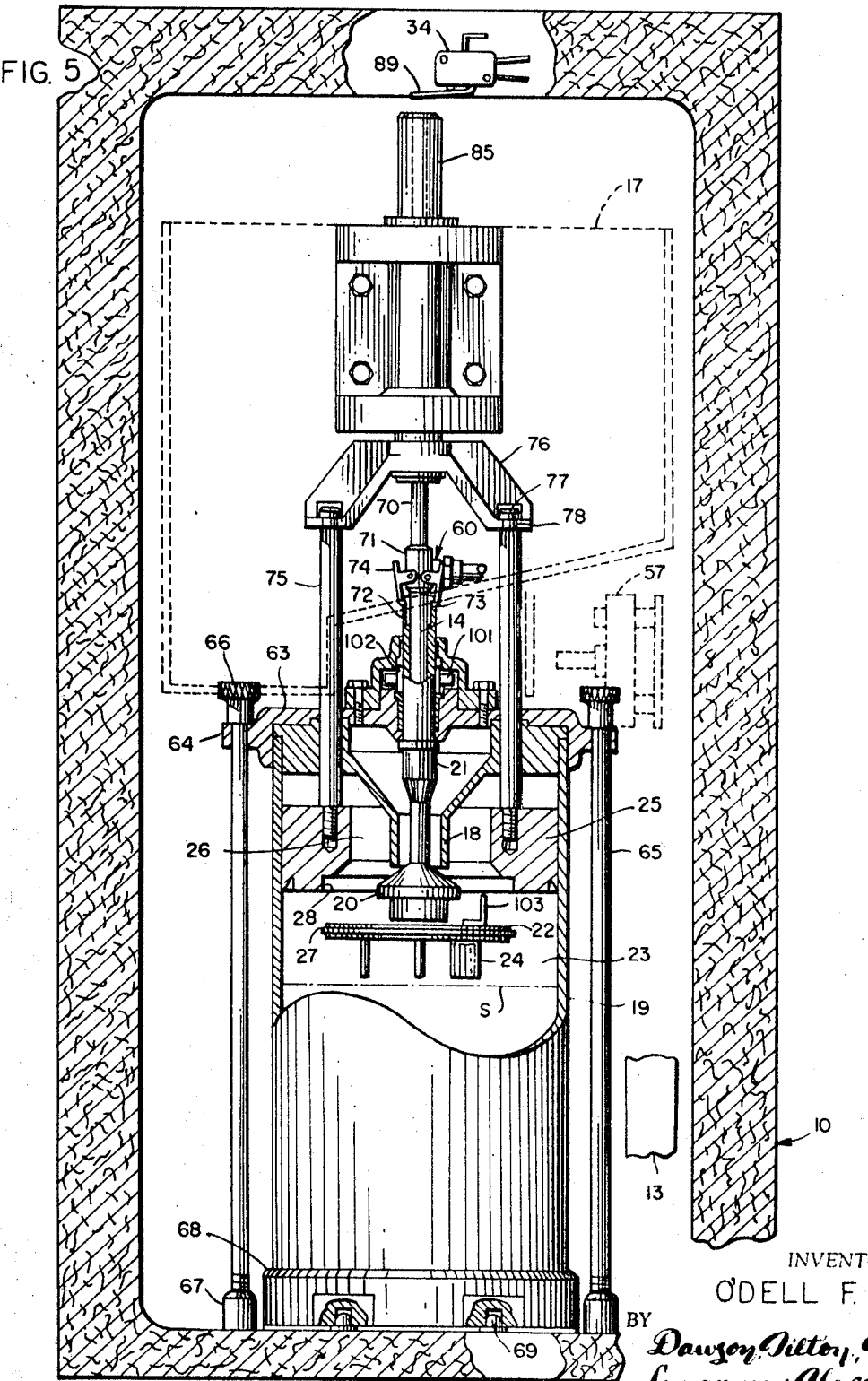
FIG. 5 is an elevational view, also partially in section, of the inventive apparatus.
Figure 6:
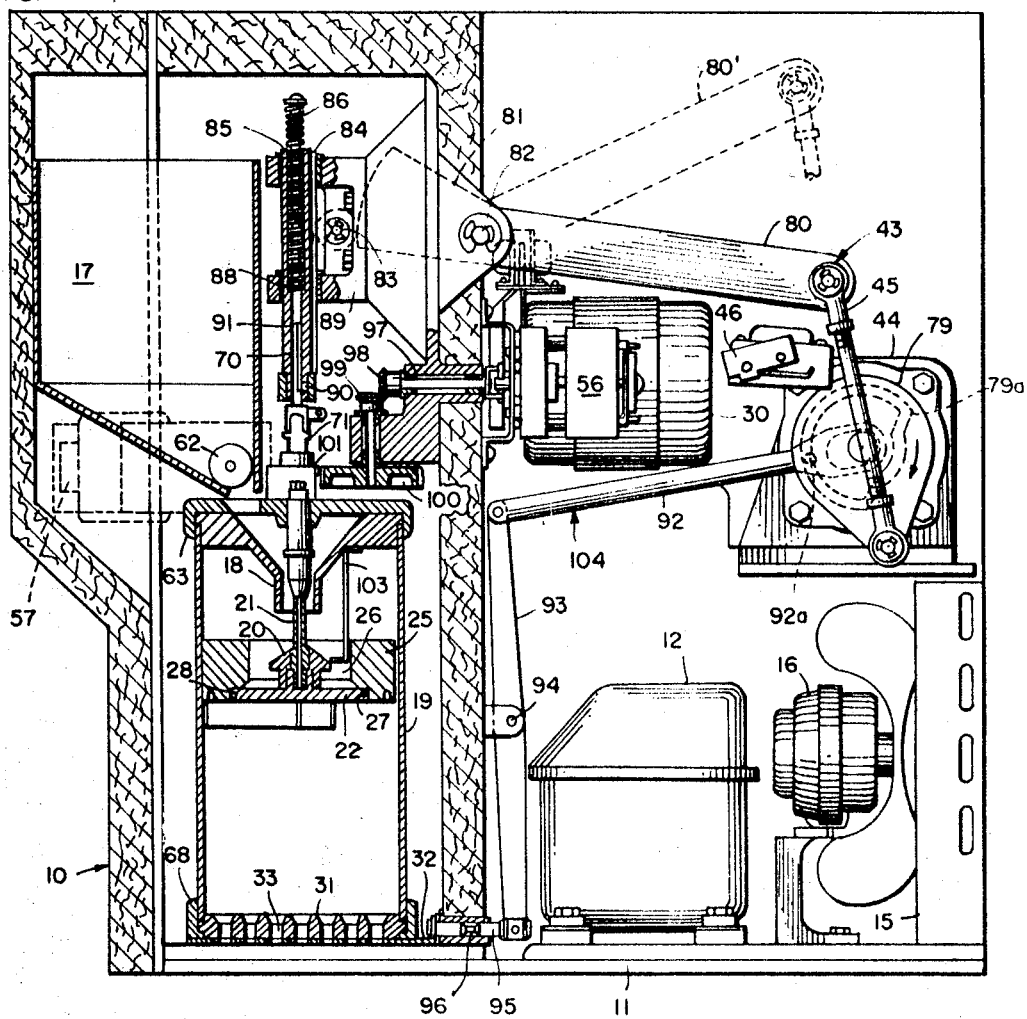
FIG. 6 is an elevational view, also partially in section of the inventive apparatus, but which is taken at an essentially right angle to the showing in FIG. 5, and which shows the basic moving parts in a different condition of operation.

Referring to FIG. 6, the dry mix is placed in the commodity hopper 17. The discharge from hopper 17 is controlled by a timer connected to commodity motor 57 (to be described hereinafter), so that over a measured time cycle, the proper amount of dry mix is dropped into a funnel 18, at the top of the extruding cylinder 19. The open top of the funnel is designated 18a in FIG. 1. The dry mix is then dropped through the funnel 18 onto a cone-shaped part 20 of hollow shaft 21, then down onto the rotating top surface of the distributing disc 22 as illustrated in FIG. 2. The orientation of working parts at this phase of the operation is also seen in FIG. 5. The orientation of parts in FIG. 6 corresponds to the beginning of the extrusion portion of the cycle, which is also depicted in perspective fashion in FIG. 3.

Just before the dry mix is dropped onto the cone-shaped part 20 of hollow shaft 21, cold water starts to flow through the hollow shaft 21, and floods the top surface of the distributing disc 22. During this procedure, the rotating distributing disc 22 allows the water to wet the particles which then are thrown off the edge of the disc 22. The water flow continues slightly longer than the dry mix flow to flush the surface of disc 22 clean. Thereafter, the wetted particles are mixed in mixing chamber 23 (designated only in FIGS. 2 and 5, which is provided by cylinder 19) with the mixing blades 24 provided on the underside of the distributing disc 22. When the mixing has been completed and before the mix thickens appreciably, the mixing blades 24 stop rotating, after which the fluid mixture develops to a dough suitable for extruding. The use of cold water slows down the absorption rate so a homogeneous mix is formed before the suspension thickens appreciably. The mixing is terminated while the suspension is still fluid. This prevents incorporation of undesirable air in the dough and produced a dense, compact product. Ordinarily, at temperature of the order of 40° F., it takes about 2½ to 3 minutes for the mix to set up into optimum consistency dough. I provide an extrusion chamber of such length so as to provide a residence time of about 3 minutes.

Figure 3:
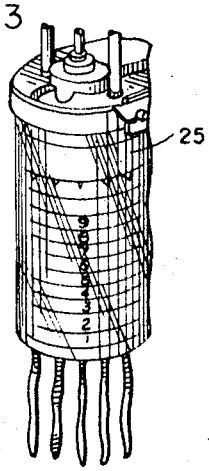

Following the mixing, a piston 25 is moved downwardly within the cylinder 19 as seen in FIG. 3. As best seen in FIG. 5, the piston 25 is apertured as at 26 to accommodate the lower portion of the funnel 18, and to receive in sealing relation the distributing disc 22. For this purpose, the distributing disc 22 is equipped with a peripheral seal 27 (consisting of an O-ring as illustrated), which fits within a properly contoured enlargement 28 of the aperture 26. At the end of the first half of the downward movement of the piston 25, the distributing disc 22 is received within the enlargement 28, and thereafter the two members 22 and 25 move together for the remaining approximate one-half of the downward movement—this being reflected in the configuration of elements seen in FIGURE 6. Thus, FIGURE 5 differs from FIGURE 6 in that the FIGURE 5 showing has the piston 25 positioned at its upper extreme, while that of FIG. 6 shows it in the lower extreme, and with the distributing disc sealingly received within the aperture 26.

For achieving the above-mentioned downward movement, a start switch 29 (see FIG. 7) is depressed so as to actuate the extruder motor 30, which starts the piston 25 on its downward movement. The piston has a free movement (in the illustration given) of approximate ¾″, allowing for the evacuation of air, after which time it comes in contact with the distributing disc 22. The next ¼″ of movement of the piston 25 completes the receipt of the distributing disc 22, thereby establishing a seal by means of the O-ring 27 on the distributing disc 22. The level of the product to be extruded now lies on a level with the bottom surface of the distributing disc 22. At this point of movement the distributing disc 22 and the piston 25 are joined to form a common piston. The remaining ¾″ stroke forces the dough down, causing the extrusion of the bottom portion through an extrusion plate or head 31. At the completion of its 1¾″ total stroke, the piston 25 is retracted to its normal rest position. When the piston has been retracted, an electrical circuit causes another charge of mix to be distributed and mixed on top of the cylinder of dough. The bottom of the extruding cylinder 19 is closed (except during extrusion) by means of a perforated cover plate 32 (see the extreme bottom portion of FIG. 6) which moves to a position whereby its openings are aligned with the openings 10 in the extrusion plate 31 when an extruding cycle is in progress. On the upstroke of the extrusion piston 25, the cover plate 32 moves back to a position of covering relation with the holes 33 and the extrusion plate 31—during this movement, the cover plate 32 acts as a cutter which cuts the extrusions so the pieces may drop as for example into a fryer basket.

SUMMARY OF OPERATION

Figure 4:
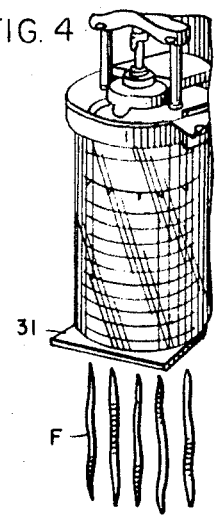

In FIGS. 2-4 I have outlined the stages that each charge follows during the mixing and extrusion. Essentially, FIG. 2 has to do with the mixing, FIG. 3 with the extrusion and FIG. 4 with return of the extrusion piston and cutoff. In FIG. 3, I have indicated a plurality of layers of dough by the numerals 1, 2, 3, etc. that have been previously mixed—although at this stage they are combined into one mass. These were each achieved by the operation depicted graphically in FIG. 2 wherein water proceeds down the hollow shaft 21 and is sprayed out over the 360° area of the distributing disc 22. The particles of the dry mix M, also represented in FIG. 2, and shown to be issuing from the funnel 18, develop a pattern of flow which is essentially conical by contact with the cone-shaped part 20, and drop onto the top surface of the distributing disc 22, as illustrated in FIG. 2, and here are wetted with the cold water. The wetter particles are then thrown centrifugally off the disc 22, and into the space between the bottom of disc 22 and the top of the dough layers where it is then mixed by the mixing blades 24. This initial distribution and wetting is quite advantageous since it insures a uniform contact between the cold water and the particles, eliminating any tendency toward lumping which might occur if the particles were not in a separated state when first contacted by the mixing water.

When the mixing blades 24 stop rotating, the particular charge being mixed is still in a cold fluid state and occupies the entire area below the mixing disc 22 and the upper surfaces in FIG. 3. As the piston 25 is moved downwardly, the dough layers are forced downwardly step wise. The layer designated by the numeral 1 is the portion that is extruded through the disc or head 31 as seen in FIG. 3.

Each layer as it is mixed is in a liquid-like state. Immediately after mixing, it starts to thicken to a dough-like consistency. Before the time it reaches the extruding position, it has been completely "set" into its dough-like state so that when it is extruded it yields a firm strip, as at F in FIG. 3. Through the practice of the invention I am able to mix and extrude cold dough continuously without having to mix the dough ingredients in one area and then transfer the dough to another area to be extruded. Also, through the fact that as one portion is extruded, another portion takes its place, I attain a continuous cycle of extrusion without any prolonged interruption. For example, in the illustration given, the cycle amounts to about 20 seconds. With 10 charges in the cylinder 19 at any given time, this develops a suitable minimum residence time of the order of 200 seconds, i.e., slightly over 3 minutes. The normal operation of the device comprehends mixing of a new batch immediately following extrusion. This can be understood, along with the associated circuitry and structure from the detailed sequence of operation set down below.

DETAILED SEQUENCE OF OPERATION

Figure 7:
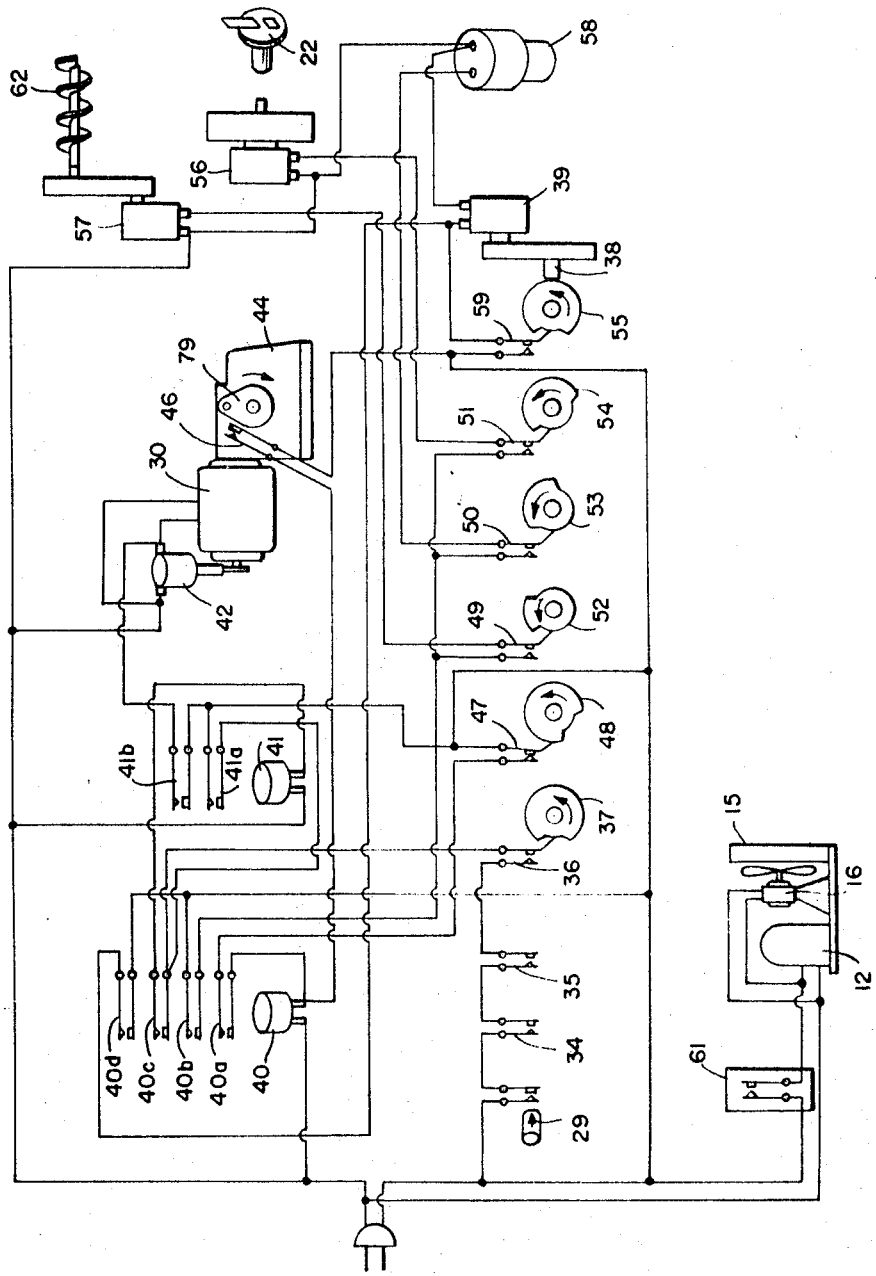
FIG. 7 is a schematic wiring diagram showing certain electromechanical features employed in the operation of the invention.

When the start switch 29 is depressed, it completes a circuit (see FIG. 7), through a water connection safety switch 34 (refer to the extreme lower left-hand portion of FIG. 7 and the upper central portion of FIG. 5). The circuit progresses through a commodity level safety switch 35 (seen only in FIG. 7) which two switches insure that the apparatus is not operated when there is inadequate raw material. The initial circuit further includes (still referring to FIG. 7) a switch 36 which is operatively associated with a first cam 37. It will be appreciated from a consideration of FIG. 7 that there are six cams mounted on a common shaft 38 operated by a cycle motor 39 and its associated cams will be described hereinafter.

At the time the circuit is initially actuated, the switch 36 is in closed condition as shown by virtue of the position of the first cam 37. Still continuing the initial circuit, current after flowing through the switch 36 further flows through the switch 40c associated with relay 40. The relay 40 is seen to have four pairs of switch blades as at 40a, 40b, 40c, and 40d.

Finally, current flowing through switch 40c goes to another relay 41 which is seen to have two pairs of switch blades as at 41a and 41b. With this the initial circuit is complete and the actuation of relay 41 causes its associated contacts 41a and 41b to close.

The closing of contacts 41a keeps relay 41 energized by completing a circuit through switch 40c of relay 40. The switch 41b on relay 41 is now closed, which energizes the extruder motor 30, and the associated extruder motor brake 42.

The motor 30 drives the piston through a crank linkage system generally designated 43 (see the upper right-hand portion of FIG. 6). By virtue of using a gearbox 44 (see FIG. 6) the output of the motor 30 is substantially reduced in speed so that only one revolution is required to complete a cycle of downward and upward movement of the piston 25. In other words, the extruder connecting rod 45 makes one revolution. The first 180° of movement forces the piston 25 down, after which it is retracted on the remaining 180° of movement. Within 10° of completing a 360° movement, a switch 46 (seen in both FIGS. 6 and 7) is actuated, which now completes a circuit to energize relay 40.

When the relay 40 is energized, switch 40a is closed which keeps relay 40 energized through a circuit including switch 47 associated with the second cam 48. Simultaneously, the switch 40b is closed, which completes a circuit to switches 49, 50 and 51, associated, respectively, with cams 52, 53 and 54. Switch 40c, associated with relay 40, opens, which breaks the circuit to the relay 41, causing relay 41 to de-energize. This in turn opens switch 41b, causing the extruder motor 30 to stop. Switch 40d closes, which completes a circuit to the cycle motor 39, causing it to energize. Thus, the situation is that the extruder motor is stopped, the extrusion function being completed, and the cycling operation controlled by the cycle motor 39 is initiated.

As the cycle motor 39 operates the cams 37, 48, 52, 53, 54 and 55—the latter being the sixth cam in proceeding from the left to the right—cam switch 36 (associated with the first cam 37) opens, breaking the circuit which includes the start switch 29. Thus, there is no possibility of reinitiating an extrusion cycle until the cams have been rotated 360°. The switch 51 associated with the fifth cam 54 is closed, which causes the mixer motor 56 (see also the upper right-hand portion of FIG. 6) to start operation and be prepared for the introduction of a new charge of dry mix and water.

The switch 49 associated with the third cam 52 closes, and this energizes the commodity motor 57 (see also the extreme left central portion of FIG. 6) which in turn causes the powdered ingredients to enter the mixing chamber 23 through the funnel 18. The switch 50 associated with the fourth cam 53 closes, energizing the water valve 58, causing the water to enter the mixing chamber 23 to be mixed with the ingredients. After the metered amounts of water and ingredients have been dispensed into the mixing chamber 23, the switches 49 and 50 open, stopping the flows of their respective products. More properly, the cams 52 and 53 are contoured to provide the proper flow times for the ingredients. After a predetermined mixing time so as to put the product into suspension, the switch 51 associated with the fifth cam 54 opens, which in turn stops the mixer motor 56.

As the cycle motor 39 continues to rotate, the switch 47 associated with the second cam 48 opens, so as to de-energize the relay 40. Upon the completion of a 360° rotation of the cycle motor 39, the switch 59 associated with the sixth cam 55, opens, which causes the cycle motor 39 to stop, and the switch 36 associated with the first cam 37 closes, so as to condition the circuit for another cycle—by activating the circuit including the start switch 29.

Three safety features are provided in the circuits: the water connection safety switch 34 will not allow the machine to operate unless the water connection has been made to the extrusion cylinder—the water connection being designated generally by the numeral 60 and seen in the central portion of FIG. 5 in conjunction with the hose 14. Another safety feature includes the commodity level safety switch 35 which will not allow the machine to operate when the commodity level in the commodity hopper 17 is low. Lastly, the refrigeration unit embodying the elements 12, 15 and 16 is activated by a thermostat 61 (see the lower left-hand corner of FIG. 7) which senses the temperature of the water and the temperature of the refrigerated compartment 10.

The commodity, i.e., the potato mix is introduced into the funnel 18 by a positive displacement means in the form of an auger 62 (see the extreme upper right-hand portion of FIG. 7, and the central left-hand portion of FIG. 6). The auger is mounted in the base of the hopper compartment 17, and meters in a predetermined quantity of dry mix as determined by the contour of cam 52.

From time to time it may be necessary to disassemble the apparatus, as for cleaning. Because of the low temperature maintained in the compartment 10, this may be necessary relatively infrequently. In such an instance, the parts of the mixer-extruder can be disassembled in the fashion seen in the exploded view of a portion of the apparatus seen in FIG. 8. In all of FIGS. 5, 6 and 8 it is seen that the cylinder 19 is closed by the cover or cap 63.

The cap 63 is equipped with a pair of diametrically opposed mounting lugs 64, which are slotted to receive mounting posts 65 (designated only in FIG. 5). The mounting posts 65 are equipped at their upper ends with integral thumb grips 66, which permits the threadable disengagement of the posts 65 from integral mounting nuts 67 (still referring to FIG. 5), which are provided as part of the compartment. By twisting the thumb grips 66, the posts 65 can be removed, which will permit removal of the cylinder 19 from the compartment. The lower portion of the cylinder 19 includes an end cap 68 which is removably positioned in place on upstanding pins 69 provided on the floor of the compartment 10. Thus, the entire cylinder 19 from the upper cap 63 to the lower cap 68 is removable from the compartment after the posts 65 have been disengaged and the water connection 60 has been disengaged.

The water connection 60 (designated only in the central portion of FIG. 5) is required, since the upper shaft 70 does not rotate, but merely reciprocates while the lower shaft 21 rotates as well as reciprocates. The water connection 60 includes a fitting 71 having an L-shaped passage therein, so as to direct water from the hose 14 down through the hollow shaft 21. For this purpose, the upper end of the hollow shaft 21 is equipped with an insert 72, which defines an annular space 73 at the upper end of the hollow shaft 21. A pair of spring-loaded fingers 74 are provided on the fitting 71 which ride in the groove 73. Upon pressing the fingers 74 together at their upper ends, the disassembly is permitted.

By moving the cylinder 19 outwardly of the compartment 10 (i.e. out of the paper in FIG. 1), the piston rods 75 are removed from the piston bracket 76. The bracket 76 has slotted recesses 77 into which the upper portions of the rods 75 fit, the rods 75 being equipped with annular recesses 78 for this purpose.

When the apparatus is assembled as seen in FIGS. 5 and 6, reciprocation of the piston 25 under the influence of the extruder motor 30 is developed by coupling the output cam 79 (see FIGS. 6 and 7) to linkage 45. The linkage 45 in turn is coupled to a lever arm 80 which is operative to move between the lower position shown in solid line and the upper dotted line position designated 80'. The end of the lever arm 80 opposite the connection with the linkage 45 is equipped with a gear segment 81 (seen only in FIGS. 6) and the lever arm 80 is pivotally mounted on the compartment 10 as at 82. The arcuate movement of the gear segment 81 is transmitted through an idler gear 83 to a rack 84 provided as part of the upper end of shaft 70 as at 85. It will be appreciated from a consideration of FIG. 6 that shafts 70 and 85 are two distinct elements, the shaft 70 being received within the hollow bore of the shaft 85 and urged upwardly therein by virtue of a spring 86 extending between a cap screw 87 on the shaft 86 and an internal shoulder 88 provided in the bore of the hollow shaft 85. Thus, whenever the hose connection 71 is disconnected from the upper end of the shaft 21, the spring 86 urges the shaft 70 upwardly and into engagement with the actuator arm 89 (see FIG. 5) of the switch 34—thereby de-energizing the electrical circuit, as mentioned previously.

As the rack 84 is moved downwardly under the influence of the gear segment 81, the shaft 85 which is suitably journaled in a bearing bracket 89 provided as part of the frame 10, moves downwardly and with it the piston rod bracket 78. The movement of bracket 78 is transmitted through the rod 75 to the piston 25, and ultimately the piston 25 engages the distributing disc 22 and together the two units move downwardly to the position shown in FIG. 6. The downward movement of the distributing disc 22 is attended by a corresponding downward movement of the shaft 21, the water supply fitting 71 and the inner shaft 70. After the extrusion operation is completed, the rack moves upwardly under the influence of the output cam 79, and for the first portion of the upward movement, the piston 25 and distributing disc 22 move together. There is, however, a vacuum created within the mixing chamber 23 (i.e., the portion of the cylinder 19 below the piston 25) so that shortly after upward movement of the piston occurs, the distributing disc 22 breaks free and remains in its lower condition until a key 90 provided as part of the outer shaft 85 engages a keying shoulder 91 on the inner shaft 70, moving the same upwardly to the FIG. 5 configuration.

Simultaneously with the movement of the piston 25 there is provided actuation of the cutoff plate 32 by means of the output cam 79. The cam 79 is coupled to the link 92 by means of a follower 92a riding in groove 79a (see FIG. 6), the movement of link 92 is imparted to a lever arm 93 pivotally mounted on the frame as at 94 (see FIG. 6). The lower end of the lever arm 93 is connected to a guided link 95 which rides in a bearing sleeve 96 (also provided as part of the frame or compartment 10) and which in turn is connected to the cutoff plate 32.

The remaining mechanical features seen in FIG. 6 include the mixer motor 56 which is equipped with an output shaft 97, miter gears 98 and 99, a spur gear 100 which drives a driven gear 101 mounted on the shaft 21 through a friction clutch 102. The friction clutch is a Torrington Company No. RC-081208 clutch which permits axial movement as well as slippage in one direction.

A specific example describing how this apparatus is used to produce extruded potato dough suitable for deep fat frying to produce an end product at least equal to any other type of deep fat fried potato product is as follows:

(1) A dry mix consisting of potato granules, salt, and binder is added to hopper 17.
(2) Dry mix weight used/charge, 72 grams.
(3) Water volume/charge, 152 ml.
(4) Water temperature, 42–44° F.

At the start of this test the extrusion cylinder was filled with dough. Fifteen charges of the above formula were then made at intervals of 30 seconds to 2 minutes—total time about 15 minutes. The fifteenth extrusion represented dough that had been made by the machine 15 minutes before it was extruded.

The subsequent extrusion charges averaged 225 grams in weight. They were cooked in deep fat at 360° F. for 105 seconds. The cooked product averaged 180 grams/charge weight.

The finished deep fat fried product had a crisp shell and very good flavor and texture. A composite analysis of the end product showed 21.4% fat, 40.8% moisture, and 37.8% solids.

Although it may be acceptable to dispense with the mixing blades 24, relying upon the centrifugal force generated by the rotating mixing disc 22, I prefer to assure a homogeneous mixture by using blade mixing as described. Here it will be appreciated that the funnel 18 delivers a stream of mix in a relatively annular fashion by virtue of the impingement thereof on the conical portion 20. Thus, I avoid any tendency of the dry mix to clump.

In practice, it is seen that the cycle commences with the extrusion, initiated by depression of the start button or switch 29 (see FIG. 7). As soon as the relay 41 is energized, the extruder motor is turned which results in one rotation of the output cam 79 of the gear box 44. This results in reciprocation of the piston 25 by virtue of the linkage 43 and, when the piston 25 is bottom dead center, the output cam 79 is oriented to actuate the linkage generally designated 104 (see the lower right-hand portion of FIG. 6) to slice off the ribbons or strips of potato dough through reciprocation of the cutoff plate 32.

As the output cam 79 concludes its rotation, it engages switch 46, which removes voltage from the extruder motor 30 and its brake 42, permitting the brake 42 to stop the motor 30.

The closing of the switch 46 additionally actuates relay 40, which powers the cycle motor 39. The cycle motor 39 operates the six cams seen in FIG. 7, i.e., elements 37, 48, 52, 53, 54 and 55, to initiate and control another mixing cycle, i.e., introducing the mix by virtue of operation of the auger 62 by the commodity motor 57, water through the water valve 58 and centrifugal and mechanical mixing by virtue of the actuation of mixer motor 56.

I claim:

1. In apparatus for producing shaped-dough pieces, a frame, an extrusion chamber on said frame, an extrusion piston reciprocably mounted within said chamber, means operatively associated with said chamber for sequentially introducing charges of dry mix and water into said chamber to form discrete charge layers, and means for reciprocating said piston within said chamber to leave at least one charge layer within said chamber whereby each charge of mix has sufficient residence time in said chamber to develop to dough before extrusion.

2. The structure of claim 1 in which said charge introducing means includes aperture means in said piston for introducing said dry mix and water into said chamber whereby each successive charge is interposed between said piston and the previous charge, said piston being reciprocably mounted to provide a volume into which said mix and water can be introduced and mixing can be accomplished.

3. The structure of claim 1 in which said piston is equipped with means for rotatably mixing each charge.

4. The structure of claim 3 in which said mixing means includes mixing blades projecting axially therefrom.

5. The structure of claim 3 in which said piston is apertured for introducing said dry mix and water, said mixing means including distributing means to receive the dry mix particles and water for wetting the particles and applying centrifugal action thereon.

6. The structure of claim 1 in which said piston is centrally apertured, a distributing disc positioned below said piston and adapted to be received within said piston aperture for completing said piston, means for delivering dry mix and water onto said distributing disc, and means for rotating said distributing disc to centrifugally discharge wetted particles therefrom.

7. The structure of claim 6 in which said distributing disc is equipped with a conical-surfaced element thereabove for impingement thereon by said dry mix whereby said dry mix is dispersed before contacting the rotating disc on which the particles are wetted and centrifugally discharged therefrom.

8. The structure of claim 7 in which said piston is equipped with an actuator shaft axially related thereto, said distributing disc being equipped with a hollow shaft coaxially related to said piston shaft, said piston shaft being mounted for reciprocation only, and coupling means between said piston shaft and disc shaft for retracting said disc.

9. The structure of claim 1 in which said frame includes a compartment, and refrigeration means operatively associated with said compartment for maintaining the same interiorly at a temperature of the order 40° F.

10. The structure of claim 1 in which said extrusion chamber is equipped with an extrusion head, and means operably associated with said reciprocating means for cutting shapes developed by said head.

11. The structure of claim 10 in which said cutting means includes a crank-operated mechanism operative to cut said shapes during retraction of said piston from said extrusion head.

12. In a method for preparing shaped-dough pieces, the steps of axially introducing discrete quantities or streams of a dry mix and water into a chamber, mixing said dry mix and water to provide fluid charges, superimposing said fluid charges, and advancing the composite mass formed by the superimposed charges partway toward an extrusion head to extrude a previous charge.

13. A method for the continuous production of shaped-dough pieces consisting essentially of:
(A) introducing successive quantities of a dry mix as individual particles into a generally vertically extending chamber to form superposed charges;
(B) wetting the particles with a quantity of cool liquid;
(C) mixing the wetted particles to form a homogeneous fluid suspension supported in said chamber by a previous like charge;
(D) applying pressure to the top of the chamber to force the bottom-most charge through extrusion dies on said chamber while moving all the charges in a downward direction.

14. The method of claim 13 in which the water and mix are deposited on a rotating disc and centrifugally discharged to a mixing area in said chamber.

15. The method of claim 14 in which said mix is uniformly distributed on said disc by a cone-like deflector above said disc.

16. The method of claim 13 in which the wetted particles are mixed to a homogeneous fluid suspension by revolving mixing blades.

17. The method of claim 13 in which the mixing is terminated while the suspension is still in a cool fluid state.

18. The method of claim 13 in which said chamber is sized so that each charge develops to an extrudable dough-like consistency before reaching the extrusion die.

References Cited

UNITED STATES PATENTS

| | | | |
|---|---|---|---|
| 2,073,779 | 3/1937 | Bramsen | 222—135 X |
| 2,955,956 | 10/1960 | Baugh et al. | 118—303 X |
| 3,384,268 | 5/1968 | Egee et al. | 227—1 |
| 774,680 | 11/1904 | Lynds | 107—30 |
| 1,397,510 | 11/1921 | Grassi | 107—52 |
| 1,790,347 | 1/1931 | Hawkins. | |
| 3,288,442 | 11/1966 | Keil | 259—8 |

WALTER A. SCHEEL, Primary Examiner

JOSEPH SHEA, Assistant Examiner

U.S. Cl. X.R.

107—54, 69; 118—303; 222—135; 259—8